Sept. 30, 1930. W. G. NAISMITH 1,776,922
TOOL RETAINER
Filed Sept. 27, 1927 3 Sheets-Sheet 1
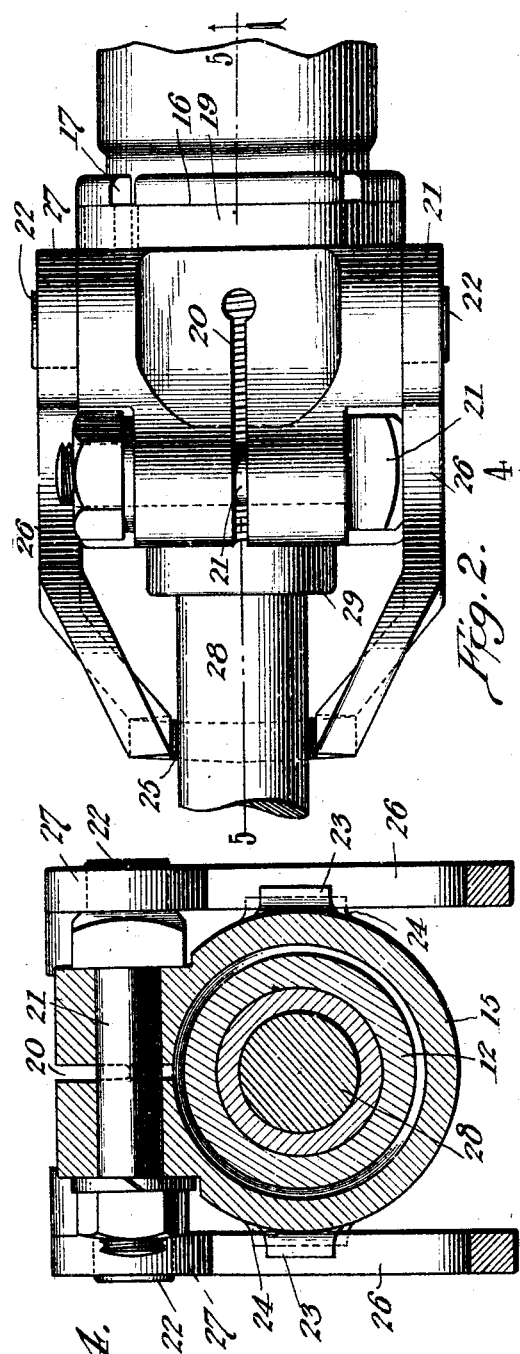
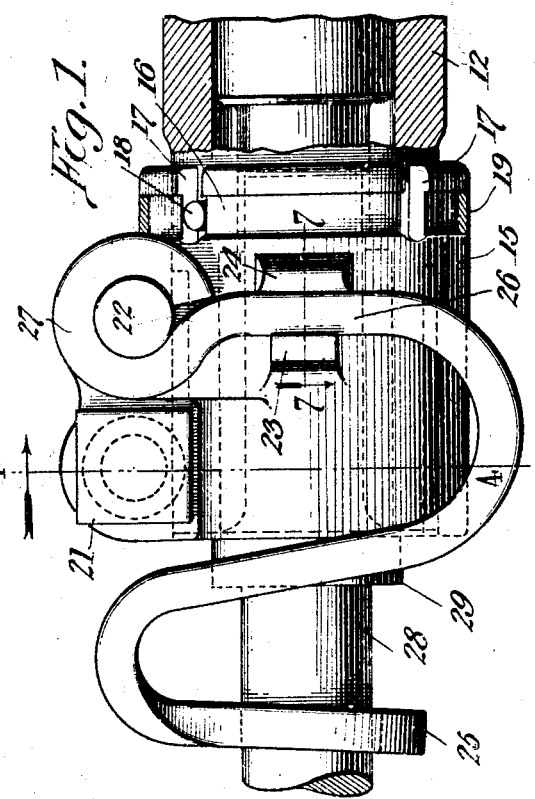
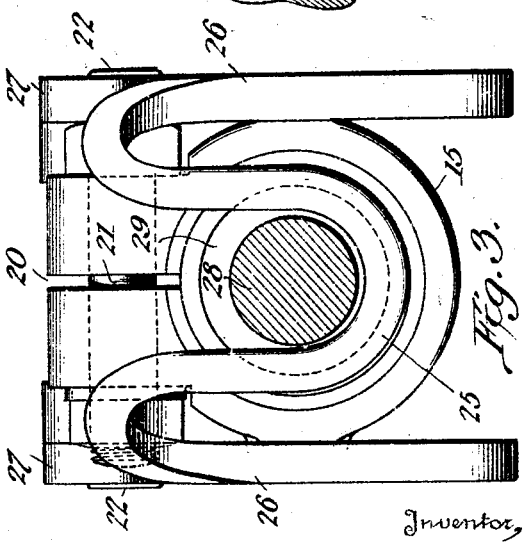
Inventor,
William G. Naismith.
By
Attorney Sept. 30, 1930.　　W. G. NAISMITH　　1,776,922
TOOL RETAINER
Filed Sept. 27, 1927　　3 Sheets-Sheet 2
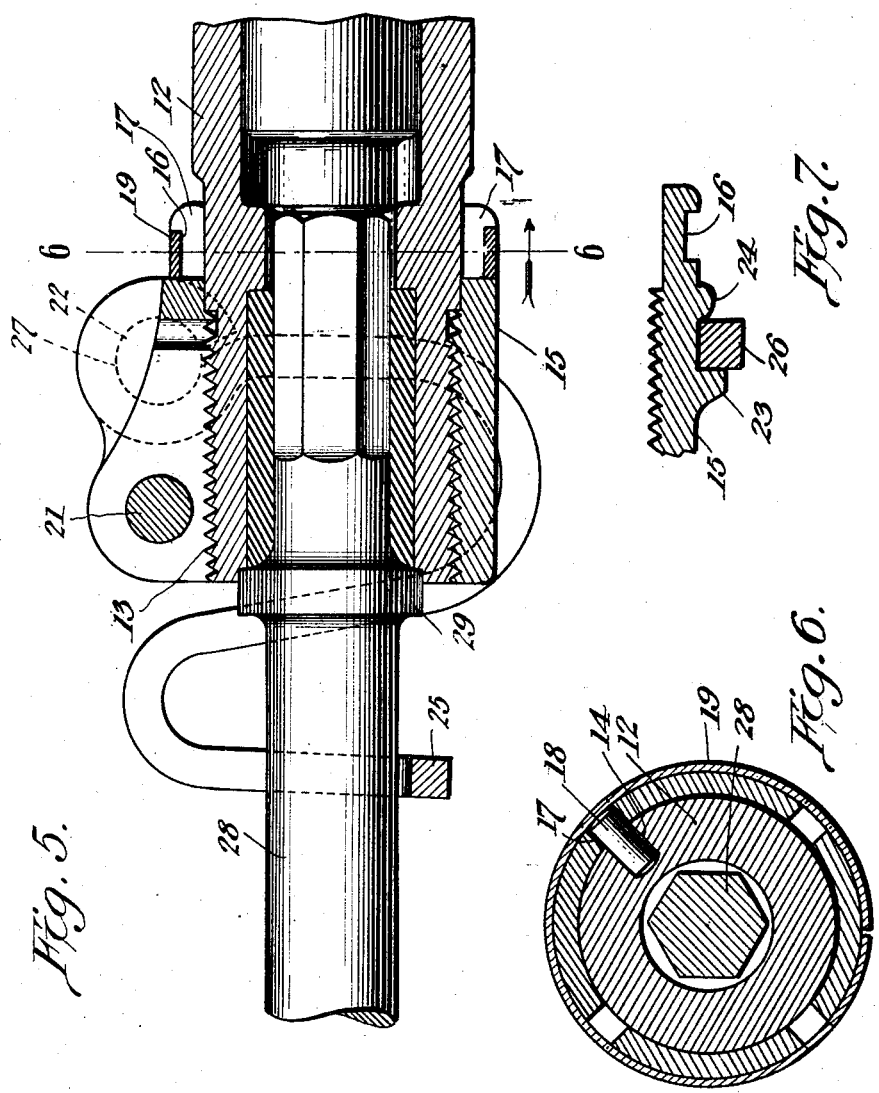
Inventor,
William G. Naismith.
By
Attorney

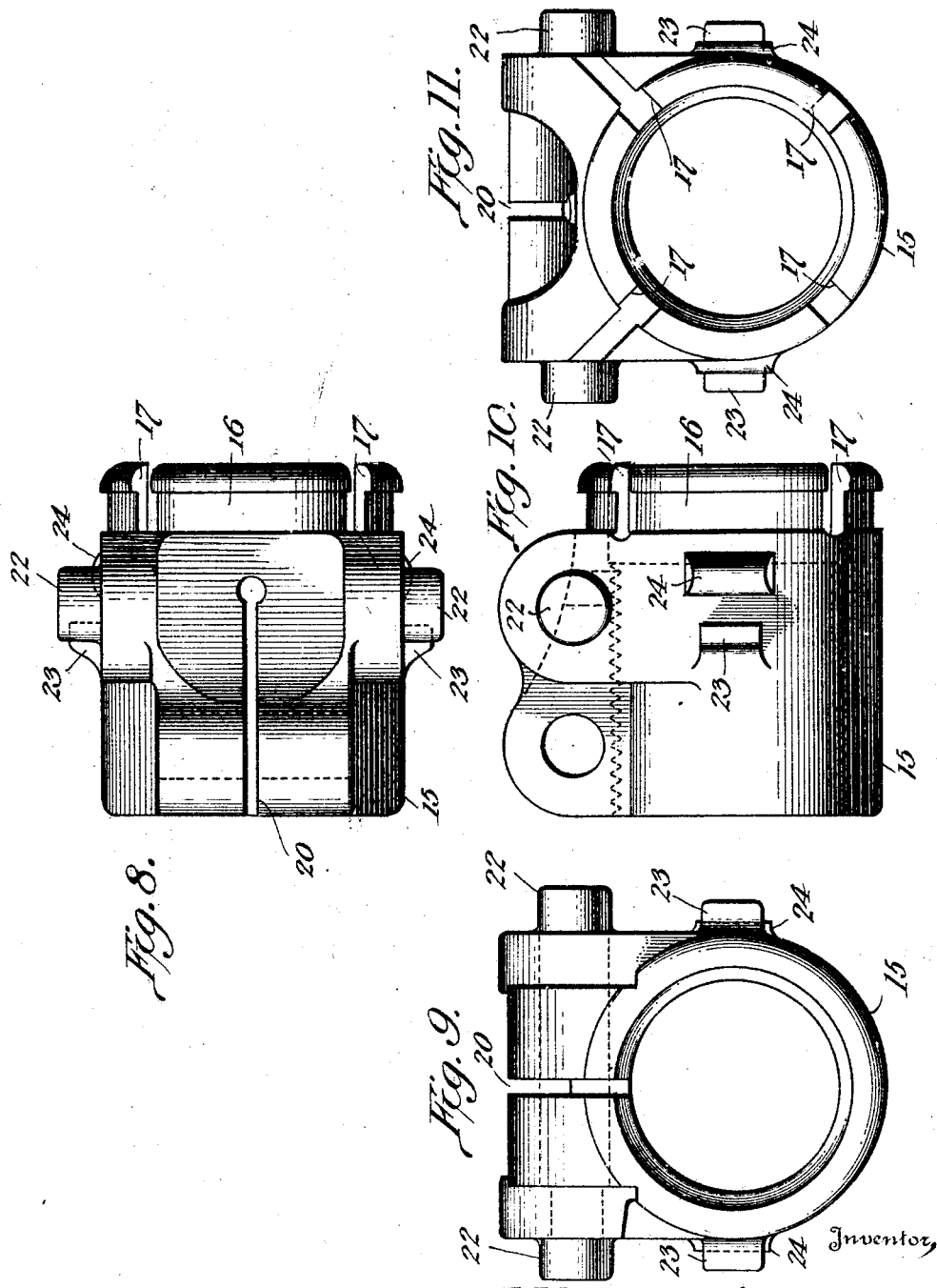

Patented Sept. 30, 1930

1,776,922

UNITED STATES PATENT OFFICE

WILLIAM G. NAISMITH, OF DENVER, COLORADO, ASSIGNOR TO THE GARDNER-DENVER COMPANY, OF DENVER, COLORADO, A CORPORATION OF DELAWARE

TOOL RETAINER

Application filed September 27, 1927. Serial No. 222,293.

The present invention relates to tool retainers for drilling machines and the like, the object being to provide a simple structure that can be readily applied to the implement and will constitute an effective retainer for the tool, while allowing it necessary limited play.

In the accompanying drawings:

Figure 1 is a side elevation of the preferred embodiment of the invention,

Figure 2 is a top plan view,

Figure 3 is a front elevation,

Figure 4 is a cross sectional view on the line 4—4 of Figure 1,

Figure 5 is a longitudinal sectional view on the line 5—5 of Figure 2,

Figure 6 is a sectional view on the line 6—6 of Figure 5,

Figure 7 is a detail sectional view on the line 7—7 of Figure 1,

Figure 8 is a top plan view of the mounting collar,

Figure 9 is a front elevation of the same,

Figure 10 is a side elevation,

Figure 11 is a rear elevation of said mounting collar.

In the embodiment disclosed, the chuck end or housing of the tool is shown at 12, and has a threaded terminal portion 13 with a radial socket 14 at the rear end of the same as shown in Figure 6.

A mounting member, comprising a collar 15, is employed that is internally threaded, and is screwed on the threaded portion 13 of the chuck housing or tool-receiving member. This collar has an annular external groove 16 in its rear end that is intersected by slots 17. When the collar is threaded on to the tool-receiving member 12, one of these slots 17 is alined with the socket 14 and a pin 18 is placed in the socket 14 and projects into the slot 17, as shown in Figure 6. The collar is thus held against turning, and the pin is retained in place by a spring ring 19 engaged in the groove 16 and covering the outer end of said pin 18. The collar furthermore has a longitudinally disposed slot 20 extending from the front end nearly to the annular groove 16. Consequently the front end portion of the collar can be contracted and a contracting bolt 21 bridges the slot 20 for the purpose of clamping the collar firmly on the tool-receiving member 12. Obviously therefore the collar is rigidly and effectively positioned against accidental displacement.

The collar is provided at its rear end portion and at one side with oppositely extending integral trunnions 22, and further has on its opposite sides sets of spaced stop lugs 23 and 24, the lugs 23 acting as abutments, the lugs 24 constituting locking elements. A retaining yoke is designated 25, and is of U-shape, so arranged that when in operative position, it extends transversely in front of the mounting collar 15 and the tool-receiving member 12. The open side of this yoke faces the same side as that carrying the trunnions 22. Side arms are provided for the yoke and are substantially S-shaped. The rear end portions 26 of these side arms terminate in eyes 27 that surround the trunnions 22 and form a pivotal mounting for the yoke. These portions 26, when the yoke is in its operative position, extend transversely of the mounting collar 15 and engage between the lugs 23 and 24.

The tool is shown at 28 and is provided with the usual collar 29. When the tool is in position and the yoke is in its operative position, it will embrace the shank of the tool 28 in advance of the collar 29, in which case, as shown in Figure 1, the portions 26 of the side arms are between the lugs 23 and 24. The yoke is thus effectively held in its operative position, but because of its formation, it is capable of yielding if subjected to blows from the collar of the tool 28. To release the tool and permit its removal, it is only necessary to swing the yoke downwardly, the portions 26 of the side arms riding over the rounded lugs 24 and allowing the yoke to drop or swing to a position alongside the collar.

It will be clear that this device is a simple and effective tool retainer and can be manufactured, assembled and mounted in assembled condition on the tool-receiving chuck or member.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What I claim, is:—

The combination with a threaded tool-receiving member, of a split contractile mounting collar threaded on the member and having opposite trunnions on one side and sets of stop lugs on opposite sides alongside the trunnions, means for contracting the collar and holding it against turning on the member, and a tool retaining yoke in advance of the collar and having an open side that opens to the side of the collar having the trunnions, said yoke having substantially S-shaped side arms, the terminal portions of which extend transversely to and on opposite sides of the collar and are pivotally mounted on the trunnions, said terminal portions detachably engaging with the lugs.

In testimony whereof, I affix my signature.

WILLIAM G. NAISMITH.